(12) United States Patent
Morenko

(10) Patent No.: US 10,508,600 B2
(45) Date of Patent: Dec. 17, 2019

(54) FIRE SHIELD INTEGRATED TO FUEL NOZZLE RETAINING BRACKET

(71) Applicant: Pratt & Whitney Canada Corp., Longueuil (CA)

(72) Inventor: Oleg Morenko, Oakville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 437 days.

(21) Appl. No.: 15/166,577

(22) Filed: May 27, 2016

(65) Prior Publication Data

US 2017/0342907 A1 Nov. 30, 2017

(51) Int. Cl.
  F02C 7/22 (2006.01)
  F02C 7/25 (2006.01)
  F02C 7/20 (2006.01)
  F23R 3/60 (2006.01)

(52) U.S. Cl.
  CPC .............. *F02C 7/22* (2013.01); *F02C 7/25* (2013.01); *F02C 7/20* (2013.01); *F02C 7/222* (2013.01); *F23R 3/60* (2013.01)

(58) Field of Classification Search
  CPC .... F02C 7/222; F02C 7/22; F02C 7/00; F02C 7/20; F02C 7/25; F23R 3/283; F23R 3/60; Y10T 137/5762; F16L 27/087; F16L 3/00; F16L 3/01; F16L 37/0925
  See application file for complete search history.

(56) References Cited

U.S. PATENT DOCUMENTS

| | | | |
|---|---|---|---|
| 2,690,648 A | 10/1954 | Pearce et al. | |
| 4,708,371 A | 11/1987 | Elsworth et al. | |
| 5,020,329 A * | 6/1991 | Ekstedt | F23R 3/28 60/737 |
| 5,168,698 A | 12/1992 | Peterson et al. | |
| 5,263,314 A | 11/1993 | Anderson | |
| 5,653,109 A | 8/1997 | Overton et al. | |
| 6,038,852 A | 3/2000 | Celi | |
| 6,339,924 B1 | 1/2002 | Hoyer et al. | |
| 6,487,860 B2 | 12/2002 | Mayersky et al. | |
| 7,992,390 B2 | 8/2011 | Patel et al. | |
| 8,978,383 B2 * | 3/2015 | Patel | F02C 7/222 60/734 |
| 9,133,770 B2 | 9/2015 | Henkle et al. | |
| 9,453,485 B2 * | 9/2016 | Masti | F16L 3/00 |

(Continued)

FOREIGN PATENT DOCUMENTS

GB 2461503 A * 1/2010 .............. F02C 7/222

OTHER PUBLICATIONS http://www.superstreetonline.com/how-to/project-car/ssts-0664-1990-mitsubishi-eclipse/ Article published date: Jan. 22, 2007 Accessed date: Jun. 11, 2018.*

Primary Examiner — Steven M Sutherland
Assistant Examiner — Jacek Lisowski
(74) Attorney, Agent, or Firm — Norton Rose Fulbright Canada LLP

(57) ABSTRACT

A retaining bracket is attached to a fuel nozzle for cooperating with a flange on a fuel transfer tube to prevent the fuel transfer tube from becoming disconnected from the fuel nozzle during engine operation. The retaining bracket is shaped so as to form an enclosure over a head of the nozzle, the enclosure acting as a fire shield to allow the nozzle to perform its intended functions for a predetermined period of time when exposed to an engine fire event.

14 Claims, 4 Drawing Sheets

(56) References Cited

U.S. PATENT DOCUMENTS

| | | | |
|---|---|---|---|
| 2006/0288707 A1* | 12/2006 | Weaver | F01D 9/023 60/796 |
| 2007/0006590 A1* | 1/2007 | Muldoon | F23R 3/20 60/761 |
| 2007/0113558 A1* | 5/2007 | Brown | F23R 3/002 60/752 |
| 2015/0113937 A1* | 4/2015 | Bleeker | F02C 7/222 60/39.091 |
| 2015/0176496 A1* | 6/2015 | Zordan | F02C 7/222 60/739 |
| 2015/0361897 A1 | 12/2015 | Steele | |

* cited by examiner

FIRE SHIELD INTEGRATED TO FUEL NOZZLE RETAINING BRACKET

TECHNICAL FIELD

The application relates generally to gas turbine engines and, more particularly, to fuel supply systems for such engines.

BACKGROUND

Fuel supply systems for combustors of gas turbine engines often include a fuel manifold, such as an external fuel manifold which extends around a gas generator case to supply fuel to fuel nozzles extending through the casing wall. A number of transfer tubes receive fuel from the main fuel line and are connected to fuel nozzles to supply fuel thereto.

At each point of connection, a retaining bracket retains the transfer tubes in place for connection to a corresponding fuel nozzle. While the retaining brackets help ensure the integrity of the fuel system, they do not offer any protection to the fuel nozzles and the transfer tube manifold against fire. However, the Federal Aviation Authority (FAA) requires that fuel conveying parts, such as fuel nozzles, be able to perform their intended functions for a minimum predetermined period of time in the case of a fire event (see for instance Title 14 of the Code of Federal Regulations, Section 33.17, the content of which is incorporated herein by reference). Additional fire shielding parts are, thus, generally needed to comply with the FAA regulations.

SUMMARY

In accordance with a general aspect, there is provided a fuel supply assembly for a gas turbine engine, comprising: at least one fuel nozzle having a head, at least one fuel transfer tube positioned outwardly of an engine case and connected in fluid flow communication with the head of the at least one fuel nozzle, and at least one retaining bracket attached to the head of the fuel nozzle, the at least one retaining bracket having at least one retaining finger engageable with the at least one fuel transfer tube to impede the at least one fuel transfer tube from becoming disconnected from the at least one fuel nozzle during engine operation, the at least one retaining bracket further comprising a fire shield forming a cover over the head of the at least one fuel nozzle.

In accordance with another general aspect, there is also provided a gas turbine engine comprising: an engine case, at least one fuel nozzle mounted to the engine case, at least one fuel transfer tube provided on a radially outer side of the engine case, the at least one fuel nozzle being connected in fluid flow communication with the at least one fuel transfer tube, at least one retaining bracket mounted to the at least one fuel nozzle, the at least one retaining bracket having at least one retaining finger configured to act as a stopper to limit movement of the at least one fuel transfer tube in a direction away from the at least one fuel nozzle, the at least one retaining bracket further comprising a fire shield overlying exposed surfaces of the at least one fuel nozzle on the radially outer side of the engine case, the fire shield being configured for allowing the at least one fuel nozzle to comply with engine fire protection requirements of Title 14 Code of Federal Regulations (14 CFR 33.17).

In accordance with a still further general aspect, there is provided a fuel nozzle for a fuel supply system of a gas turbine engine, the fuel nozzle comprising: a nozzle head projecting outwardly from a gas generator case for connection with at least one fuel transfer tube, a retaining bracket detachably mounted to the nozzle head and configured to cooperate with a shoulder on the at least one fuel transfer tube to prevent disconnection of the at least one fuel transfer tube from the nozzle head during engine operation, the retaining bracket having a fire shielding body forming a protective cover over the nozzle head, the fire shielding body allowing the nozzle head to withstand a 2000° F. average flame temperature for a minimum of 5 minutes while still being capable of performing its intended functions.

BRIEF DESCRIPTION OF THE DRAWINGS

Reference is now made to the accompanying figures in which.

DETAILED DESCRIPTION

Figure 1:
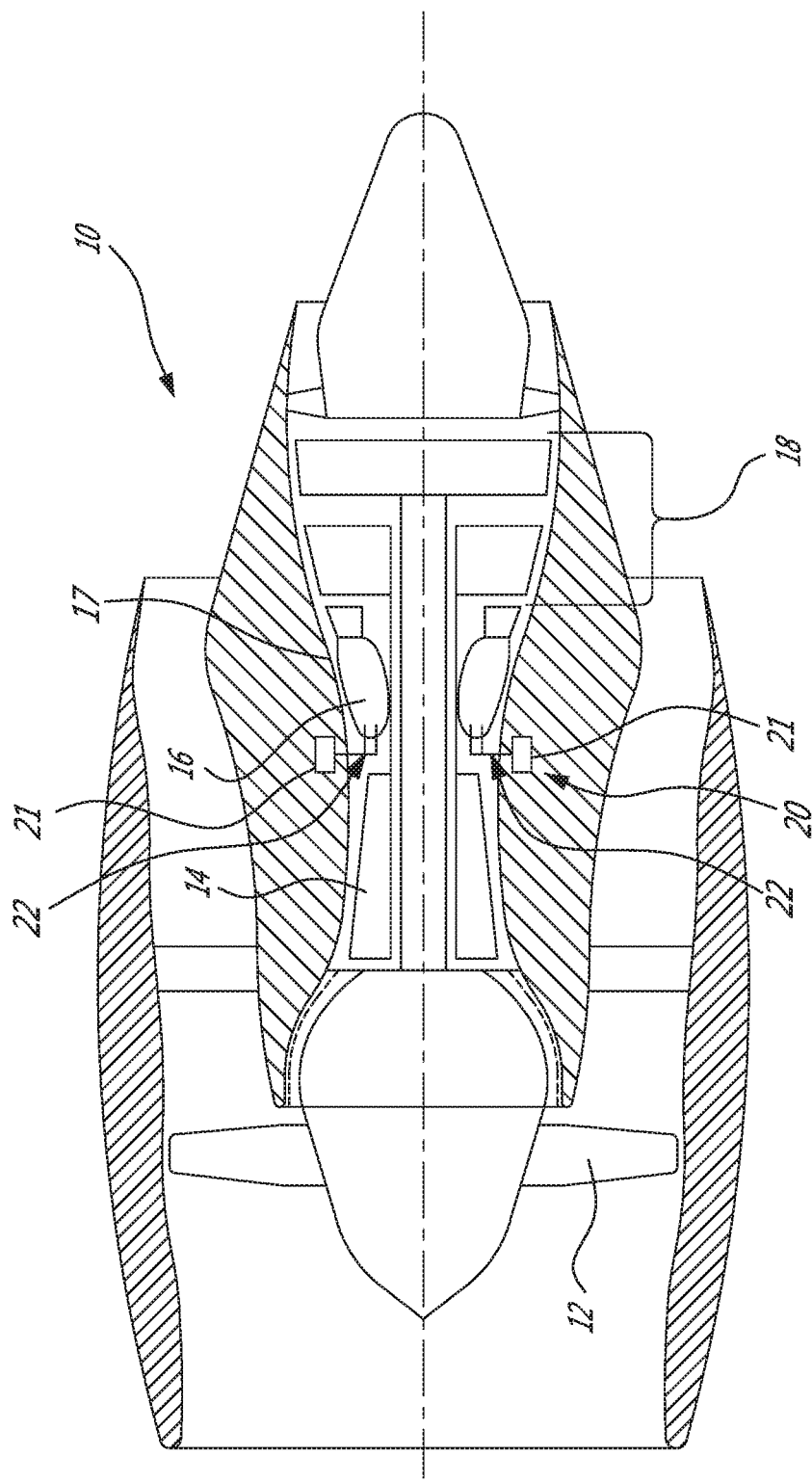
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
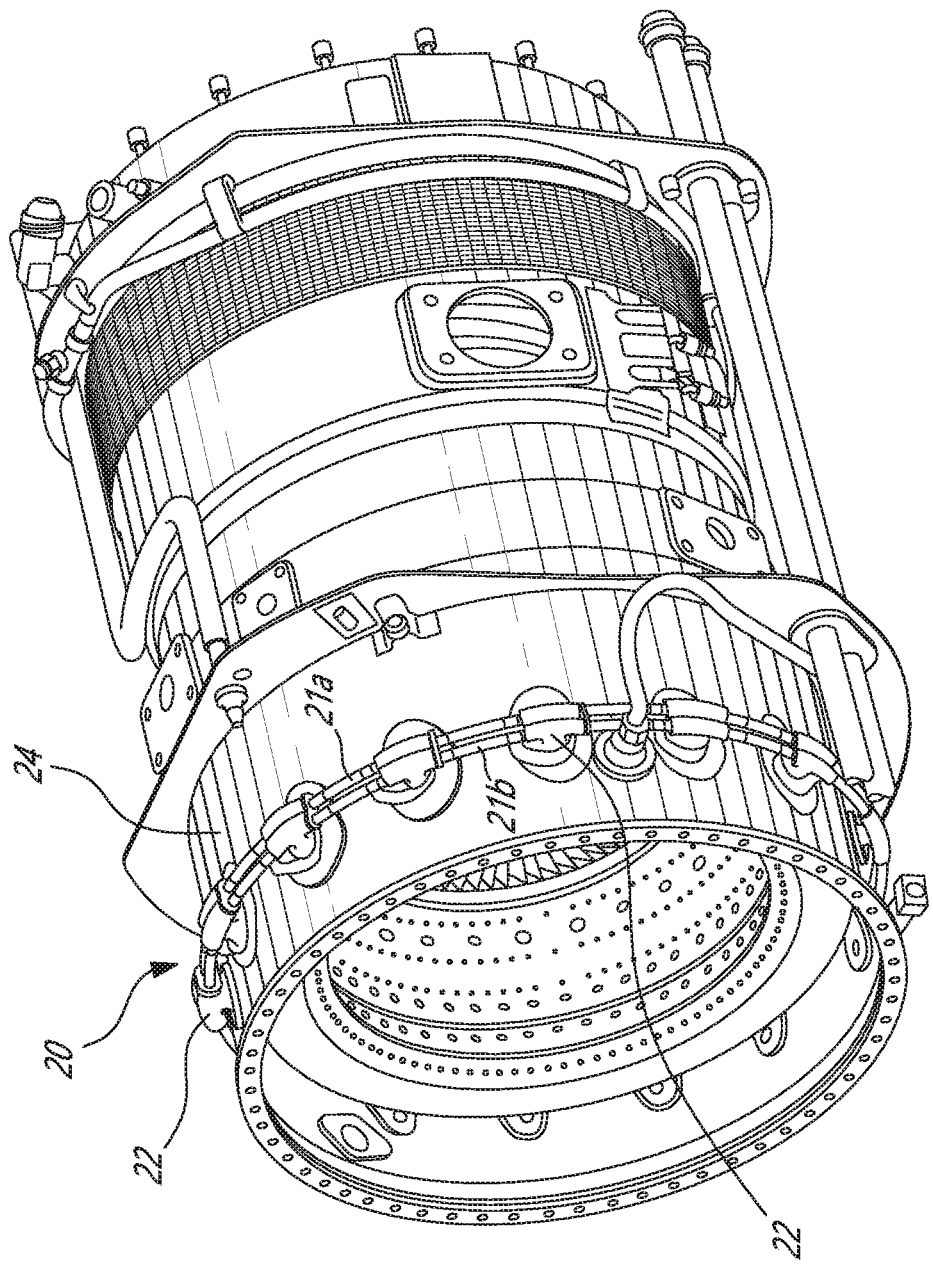
FIG. 2 is an isometric view of a gas generator case section of the engine.

The combustor 16 has a fuel supply assembly 20 including at least one fuel nozzle 22 connected to source of fuel via at least one fuel transfer tube 21. As shown in FIG. 2, the fuel supply assembly 20 typically comprises a plurality of circumferentially spaced-apart fuel nozzles 22 mounted to a gas generator case 24 surrounding the combustor 16. According to the illustrated example, each fuel nozzle 22 is connected in fluid flow communication with primary and secondary fuel transfer tubes 21a, 21b.

Each nozzle 22 typically has a nozzle head protruding outwardly from the gas generator case 24, a nozzle tip for injecting the primary and secondary fuel into the combustion chamber of the combustor 16, and a nozzle stem connecting the head to the tip and providing fuel communication therebetween.

Figure 3:
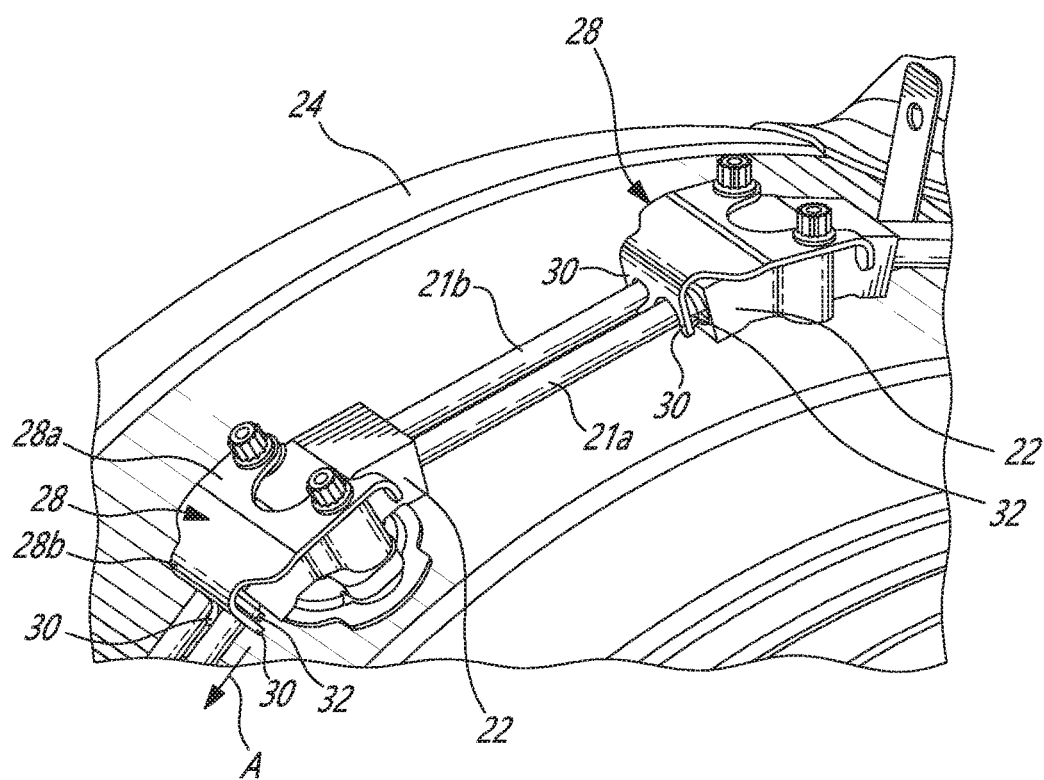
FIG. 3 is an isometric view illustrating a retaining bracket mounted to a fuel nozzle to prevent primary and secondary fuel transfer tubes from becoming accidently disconnected from the fuel nozzle during engine operation.

Referring to FIG. 3, it can be seen that the fuel supply assembly 20 also includes a retaining bracket 28 or clip at each fuel nozzle 22 to prevent accidental disconnection of the primary and secondary fuel transfer tubes 21a, 21b during engine operation. Each bracket 28 may have a unitary generally L-shaped body. The primary leg 28a of the body may be bolted or otherwise suitably attached to the top of the head of an associated one of the fuel nozzles 22 after the primary and secondary fuel transfer tubes 21a, 21b have been appropriately connected to the nozzle 22. The secondary leg 28b of each L-shaped bracket 28 extends radially inwardly towards the gas generator case 24 for engagement with the primary and secondary fuel transfer tubes 21a, 21b.

The secondary leg 28b is provided with a set of retaining fingers 30 or other suitable gripping structure for engagement behind corresponding flanges 32 provided at the connection end of the primary and secondary fuel transfer tubes 21a, 21b. According to the illustrated embodiment, a set of three retaining fingers 30 is integrally formed in the secondary leg 28b of the bracket 28. The fingers 30 can be readily formed by cutting slots or grooves in the secondary leg 28b of the L-shaped body of the bracket 28, the slots/grooves being shaped to accommodate the primary and secondary fuel transfer tubes 21a, 21b. The primary and secondary fuel transfer tubes 21a, 21b extend between the fingers 30 through the gaps/grooves between the fingers. The flanges 32 on the tubes 21a, 21b are trapped or retain in a captive manner between the retaining fingers 30 of the bracket 28 and the fuel nozzle 22. The retaining fingers 30 cooperate with the flanges 32 on the tubes 21a, 21b to limit the movement of the tubes in a withdrawal direction indicated by arrow A in FIG. 3. In other words, the retaining fingers 30 prevent the tubes 21a, 21b from moving out of engagement from the fuel nozzle 22. The retaining fingers 30 can be initially slightly spaced from the flanges 32 so as to permit a certain amount of movement between the fuel nozzles 22 and the tubes 21a, 21b in order to accommodate thermal expansion during engine operation. In view of the foregoing, it can be appreciated that the retaining brackets 28 are employed to reduce the likelihood and/or prevents the transfer tubes 21a, 21b from disengaging from the nozzles 22 during engine operation.

Figure 4:
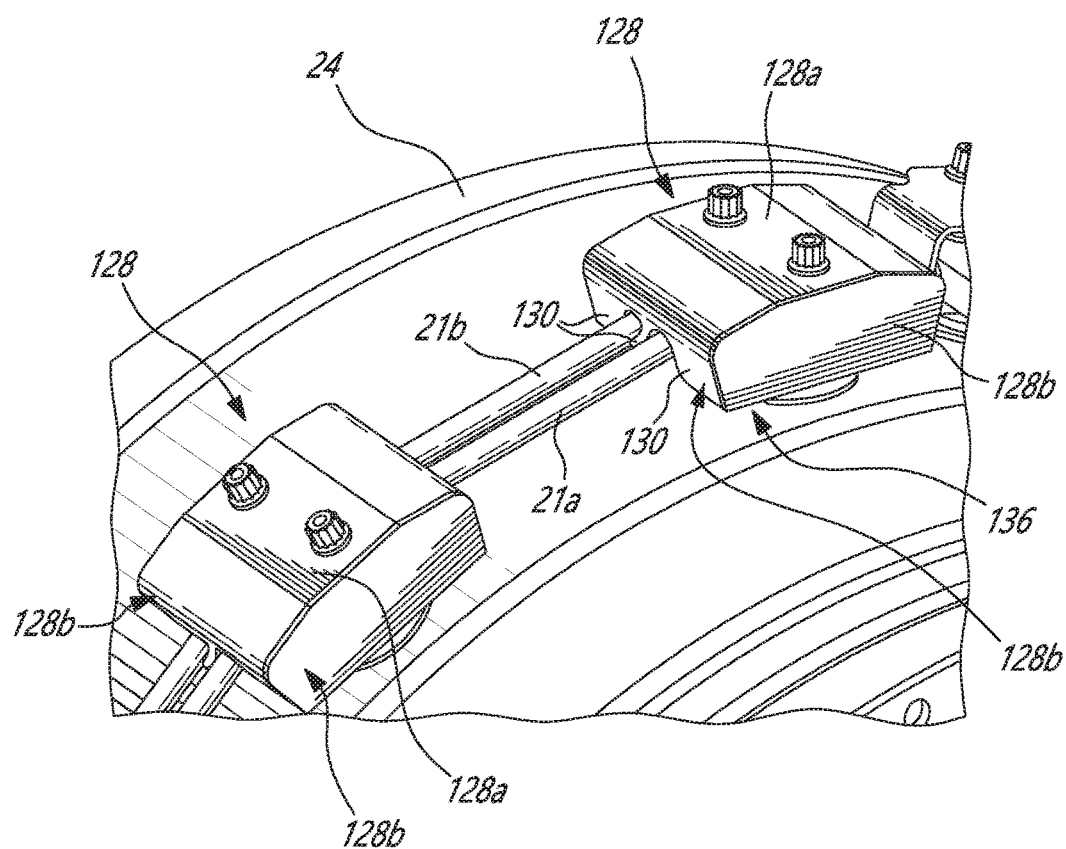
FIG. 4 is an isometric view of a multi-function retaining bracket integrated with a fire shield or heat shield to protect the fuel nozzle against fire for a predetermined period of time in case of an engine fire event.

As shown in FIG. 4, the functionality of the retaining bracket can be widened by changing the bracket shape and configuration. Indeed, the brackets can be configured to not only have a retaining function but also a fire shielding function to protect the fuel nozzles 22 and the transfer tube manifold for a predetermined period of time in case of an engine fire event. For instance, the retaining brackets could be configured as a fire shielding enclosure or cover to allow the fuel supply assembly 20 to comply with the engine fire protection requirements of Title 14 Code of Federal Regulations (14 CFR 33.17) or any other equivalent regulations of a competent Federal Aviation Administration (FAA).

According to the embodiment shown in FIG. 4, each bracket 128 has a unitary box-shaped body including a main plate 128a adapted to be bolted on top of the associated fuel nozzle 22 and 4 side plates 128b depending from the perimeter of the main plate 128a. The main plate 128a and the side plates 128b define an open ended enclosure to be fitted over the head of the associated nozzle 22 and an adjoining portion of the transfer tubes 21a, 21b. The box-shaped body should be large enough to cover the top and the sides of the nozzle head with some extra room to keep flame away from the nozzle head. The contact area between the box-shaped body and the nozzle head should be minimized to minimize heat transfer from the bracket to the nozzle head. For instance, the box-shaped body of the bracket could only contact the nozzle head around the bolts used to secure the bracket to the nozzle head. The remaining surface of the box-shaped body could be spaced from the nozzle head. A heat insulator could be provided between the nozzle head and the bracket. Provisions are taken to ensure proper ventilation of the internal volume defined by the enclosure. For instance, a properly calibrated opening underneath the bracket may be provided. The opening can take the form of a gap 136 between the side plates 128b of the bracket and the outer surface of the gas generator case 24. The air gap between the bracket and the nozzle head should be minimized to minimize heat input.

The retaining fingers 130 are integrated to the side plates 128b provided at circumferentially opposed ends of the bracket enclosure. The retaining fingers 130 can be integrally provided in the circumferentially opposed side plates 128b by cutting a pair of side-by-side grooves in the free distal edge of the circumferentially opposed side plates 128b, the grooves being shaped to accommodate the primary and secondary fuel transfer tubes 21a, 21b.

According to one application, the bracket 128 may be made out of a sheet metal alloy or any other materials allowing the fuel nozzle 22 to be considered fire resistant. A preferable material option for the bracket is a material with a low thermal conductivity and high oxidation resistance (e.g. AMS5512, INCONEL 625). According to the regulations, a component is considered fire resistant when the component is capable of performing those functions intended to be performed while exposed to heat and other conditions that are likely to occur at the particular location, and to withstand a 2000° F. average flame temperature for a minimum of 5 minutes. According to another application, the bracket 128 may be made of a material (e.g. steel) adapted to withstand a 2000° F. average flame temperature for a minimum of 15 minutes. A high temperature oxidation resistant coating could also be applied to the bracket to improve its fire resistant properties.

The material thickness of the bracket should be thick enough to prevent a burn-trough for at least 5 minutes, preferably 10 minutes and more preferably for 20 minutes. The fire shield integrated to the bracket should be thick/strong enough and rigid to prevent fire shield deformation/opening due to a fire.

In light of the above, it can be appreciated that the brackets 128 shown in FIG. 4 are multi-purpose. Indeed, the brackets 128 prevent the transfer tubes 21a, 21b from becoming disconnected from the fuel nozzle 22 during engine operation and they also act as fire shields to allow the fuel nozzles 22 and the transfer tube manifold to remain operational for a predetermined period of time in the unlikely event of a fire. The use of an integrated retaining bracket/fire shield part eliminates the needs for separate heat shield parts to protect the fuel nozzles. It may also contribute to improve durability and reliability.

The above description is meant to be exemplary only, and one skilled in the art will recognize that changes may be made to the embodiments described without departing from the scope of the invention claimed. For example, while the retaining brackets have been described as including a set of retaining fingers, it is understood that a bracket could have a single finger or an equivalent retaining structure for engagement behind the transfer tube flange. Still other modifications which fall within the scope of the claimed invention will be apparent to those skilled in the art, in light of a review of this disclosure, and such modifications are intended to fall within the appended claims.

The invention claimed is:

1. A fuel supply assembly for a gas turbine engine, comprising:
   at least one fuel nozzle having a head,
   at least one fuel transfer tube positioned outwardly of an engine case and connected in fluid flow communication with the head of the at least one fuel nozzle, and
   at least one retaining bracket having a body fastened to the head of the at least one fuel nozzle, the body comprising:
      a main plate overlying the head of the at least one fuel nozzles, side plates depending from the perimeter of the main plate about the head of the at least one fuel nozzle, the main plate and the side plates defining a fire shielding enclosure over the head of the at least one fuel nozzle, and at least one retaining finger defined in one of the side plates of the body, and the one of the side plates being transverse to the at least one transfer tube, the at least one retaining finger enqaqeable with the at least one fuel transfer tube to impede the at least one fuel transfer tube from becoming disconnected from the at least one fuel nozzle in a direction parallel to a longitudinal direction of the at least one fuel transfer tube.

2. The fuel supply assembly as defined in claim 1, wherein a ventilation opening is provided underneath the fire shielding enclosure, and wherein the fire shielding enclosure and the head of the at least one fuel nozzle are spaced by an air gap.

3. The fuel supply assembly defined in claim 1, wherein the main plate is bolted to the head of the at least one fuel nozzle, and wherein the fire shielding enclosure has an internal volume, which is greater than the volume occupied by the head of the at least one fuel nozzle, thereby providing for an internal gap between the head of the at least one fuel nozzle and the fire shielding enclosure.

4. The fuel supply assembly defined in claim 1, wherein the at least one fuel transfer tube has an arresting flange at a connecting end portion thereof, and wherein the arresting flange is trapped between the at least one fuel nozzle and the at least one retaining finger of the at least one retaining bracket.

5. The fuel supply assembly defined in claim 1, wherein a slot is defined in the one of the side plates, the at least one fuel supply tube extending through the slot, wherein the at least one retaining finger comprises a pair of retaining fingers formed on opposed sides of the slot in the one of the side plates, and wherein a flange extends from the at least one fuel transfer tube for engagement with the pair of retaining fingers, the flange being trapped between the pair of retaining fingers and the head of the at least one fuel nozzle, thereby impeding withdrawal of the at least one fuel transfer tube from the at least one fuel nozzle.

6. The fuel supply assembly defined in claim 1, wherein the fire shielding enclosure is configured to allow the at least one fuel nozzle to withstand a 2000° F. average flame temperature for a minimum of 5 minutes.

7. A gas turbine engine comprising:
an engine case,
at least one fuel nozzle mounted to the engine case,
at least one fuel transfer tube provided on a radially outer side of the engine case, the at least one fuel nozzle being connected in fluid flow communication with the at least one fuel transfer tube,
at least one retaining bracket having a body fixedly mounted to the at least one fuel nozzle, the body defining a fire shielding enclosure overlying exposed surfaces of the at least one fuel nozzle on the radially outer side of the engine case, the fire shielding enclosure configured to allow the at least one fuel nozzle to withstand a 2000° F. average flame temperature for a minimum of 5 minutes, and wherein the body has at least one retaining finger configured to act as a stopper to limit movement of the at least one fuel transfer tube in a direction away from the at least one fuel nozzle.

8. The gas turbine engine defined in claim 7, wherein the fire shielding enclosure is provided in the form of an open ended enclosure configured to cover the at least one fuel nozzle on the radially outer side of the engine case, and wherein the open ended enclosure and the radially outer side of the engine case jointly define a gap opening for ventilation.

9. The gas turbine engine defined in claim 8, wherein the at least one retaining finger is formed in a side of the open ended enclosure, the at least one fuel transfer tube extending through a slot defined in said side.

10. The gas turbine engine defined in claim 7, wherein the at least one fuel transfer tube has a flange trapped between the at least one fuel nozzle and the at least one retaining finger.

11. The gas turbine engine defined in claim 7, wherein the unitary body comprises:
a main plate bolted on top of the at least one fuel nozzle, and
side plates depending from the perimeter of the main plate, the main plate and the side plates defining together an internal volume configured to accommodate a head portion of the at least one fuel nozzle protruding outwardly from the engine case.

12. A fuel nozzle for a fuel supply system of a gas turbine engine, the fuel nozzle comprising:
a nozzle head projecting outwardly from a gas generator case for connection with at least one fuel transfer tube, and
a retaining bracket having a body detachably mounted to the nozzle head and configured to cooperate with a shoulder on the at least one fuel transfer tube to prevent disconnection of the at least one fuel transfer tube from the nozzle head during engine operation, the body forming a protective cover over the nozzle head, the protective cover allowing the nozzle head to withstand a 2000° F. average flame temperature for a minimum of 5 minutes while still being capable of performing intended functions of the nozzle head, wherein the protective cover is provided in the form of a sheet metal box-like enclosure with a bottom open end.

13. The fuel nozzle defined in claim 12, wherein at least one side of the sheet metal box-like enclosure has at least one groove defined therein for receiving the at least one fuel transfer tube.

14. The fuel nozzle defined in claim 12, wherein a ventilation opening is provided underneath the protective cover.

* * * * *